March 22, 1927.
C. NIEDERHAUSER
1,622,163
LIQUID DISPENSING DEVICE
Filed Oct. 20, 1926
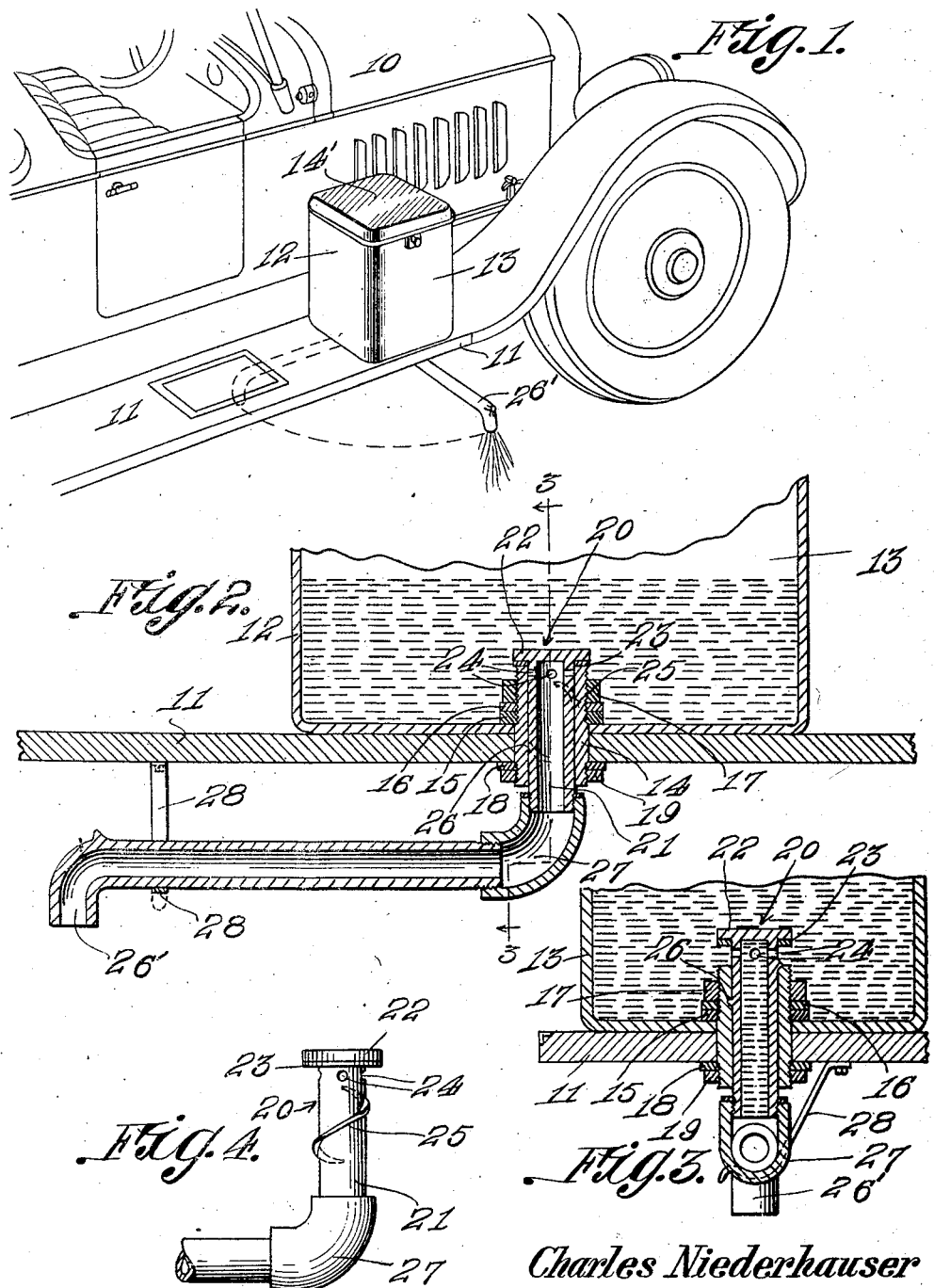
Charles Niederhauser
INVENTOR
BY Victor J. Evans
ATTORNEY
WITNESS:

Patented Mar. 22, 1927.

1,622,163

UNITED STATES PATENT OFFICE.

CHARLES NIEDERHAUSER, OF WOODHAVEN, NEW YORK.

LIQUID-DISPENSING DEVICE.

Application filed October 20, 1926. Serial No. 142,928.

This invention relates to improvements in liquid dispensing devices and has particular reference to a tank for use upon automobiles for carrying a supply of water for washing purposes.

The primary object of the invention resides in a liquid dispensing device adapted to be carried on a suitable part of an automobile and especially on the running board for use when travelling, so that a person may cleanse their hands after an emergency repair job.

Another object of the invention is the provision of a liquid dispensing tank for mounting upon the running board of an automobile and which includes a swingingly mounted spout which is normally concealed beneath the running board, but which spout when moved to a position beyond the side edge of the running board, automatically opens the control valve for dispensing the contents of the tank through said spout.

Another object of the invention is to provide an auxiliary tank for carrying a supply of water when touring in an automobile so that a supply of fresh water may be kept on hand for washing and drinking purposes, and for replenishing water in the radiator of the automobile.
With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a fragmentary perspective view of an automobile with my tank mounted on the running board.

Figure 2 is a vertical sectional view therethrough with the valve in a closed position.

Figure 3 is a detail sectional view on the line 3—3 of Figure 2 but showing the valve in an open position.

Figure 4 is a detail elevational view of the valve member.

Referring more particularly to the drawing, the reference numeral 10 designates a portion of an automobile, 11 the running board thereof, and 12 my improved water tank which is mounted forward on the running board so as not to interfere with the ingress and egress of passengers through the front doors.

My improved tank 12 comprises a container 13 which is open at its top and normally closed by a removable cover 14', and closed at its bottom, which bottom rests upon the running board 11. The container 13 is rigidly mounted upon the running board by passing a tubular sleeve 14 through an opening in the bottom of the container and through an aligned opening in the running board, the ends of the sleeve being externally screw threaded. A rubber gasket 15 fits over the top end of the sleeve and is seated against the bottom of the container for sealing the joint between the sleeve and the container, while a metal washer 16 overlies the gasket and is held tight thereagainst by a nut 17 threaded to the upper end of the sleeve. A metal washer 18 is fitted over the lower end of the sleeve and against the underside of the running board and is held tight thereagainst by a nut 19 co-acting with the lower threaded end of the sleeve. It will be seen that the container is held tight upon the running board so as to withstand the vibrations of the automobile while in motion.

The sleeve 14 serves as a bearing for a valve member 20 which member includes a tubular length of pipe 21, which is externally screw threaded on its lower end while its opposite end is closed and provided with a head 22, the underface of which is provided with a gasket 23 to seat on the top edge of the sleeve 14 when the valve member is in a closed position. The valve member is provided with openings 24 which are concealed against the walls of the sleeve 14 when the valve member is in a closed position. The valve member is turnably mounted within the sleeve and for the purpose of moving the same vertically with respect thereto to lift the valve head off the seat and to uncover the openings 24, I provide the exterior of the tubular pipe of the valve member with a single spiral thread 25 which co-acts with a similar thread 26 on the interior of the sleeve 14. It will therefore be seen that upon turning of the valve member, the same will be lifted or lowered vertically to open and close the communication between the interior of the container and the discharge end of the valve member.

A spout 26' is mounted on the lower end of the valve member 20 by means of an elbow 27 whereby the spout extends at right angles to the axis of the valve member. Normally, the spout is concealed beneath the running board at which time the valve member is in a closed position as shown in Figure 3 of the drawing, and is held against swinging movement by a spring clip 28 fastened to the underside of the running board. Should it be desired to dispense any of the contents of the container, it is only necessary to disengage the spout from the spring clip and swing the same to a position shown in Figure 3 of the drawing, which causes the lifting of the valve to permit of the free flow of the contents from the container. It will be seen that the valve is automatically controlled by the actuation of the spout from a concealed position to an exposed position.

Although I have mentioned that the device is especially adapted for use on automobiles, it will be appreciated that the same may be used for various other purposes such as the dispensing of beverages and the like.

What is claimed as new is:—

1. In combination with a support, of a tank mounted thereon, a cylindrical sleeve extending through said support and the bottom of said tank, said sleeve having cooperating means for clamping the tank onto the support in liquid tight connection, a valve member comprising a tubular portion snugly fitting and rotatably and reciprocably mounted within said sleeve, said valve member having a head at the top or inner end thereof for seating engagement with the top of said sleeve, said tubular portion having lateral openings near the inner end thereof, a spout rotatably carried by the lower or outer end of said tubular member, and coacting means between the sleeve and valve member for raising and lowering said valve member upon the turning of said spout to different positions, whereby said head is unseated from and seated against the top of said sleeve, respectively, for exposing said openings above or closing them by telescoping within the top of said sleeve.

2. In combination with a support, of a tank mounted thereon, a cylindrical sleeve extending through said support and the bottom of said tank, said sleeve having cooperating means for clamping the tank onto the support in liquid tight connection, a valve member comprising a tubular portion snugly fitting and rotatably and reciprocably mounted within said sleeve, said valve member having a head at the top or inner end thereof for seating engagement with the top of said sleeve, said tubular portion having lateral openings near the inner end thereof, a spout rotatably carried by the lower or outer end of said tubular member, and coacting means between the sleeve and valve member for raising and lowering said valve member upon the turning of said spout to different positions, whereby said head is unseated from and seated against the top of said sleeve, respectively, for exposing said openings above or closing them by telescoping within the top of said sleeve, and means carried by said support and engageable with said spout when in an inoperative position for holding said spout against rotation.

In testimony whereof I have affixed my signature.

CHARLES NIEDERHAUSER.